Jan. 28, 1969   R. H. VOIGT ET AL   3,425,009
ELECTRO-MECHANICAL ACTUATOR
Filed Sept. 10, 1965   Sheet 1 of 2
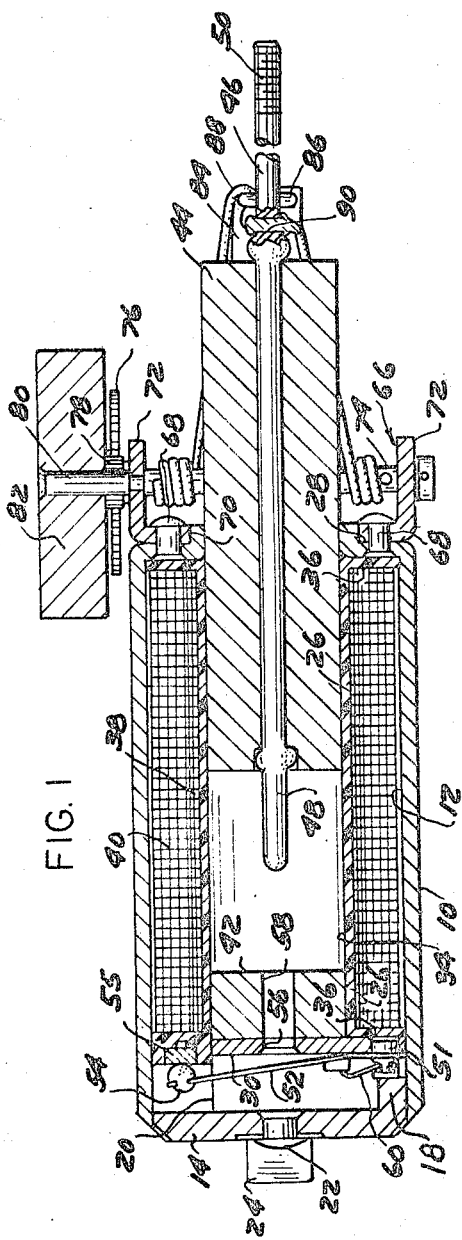
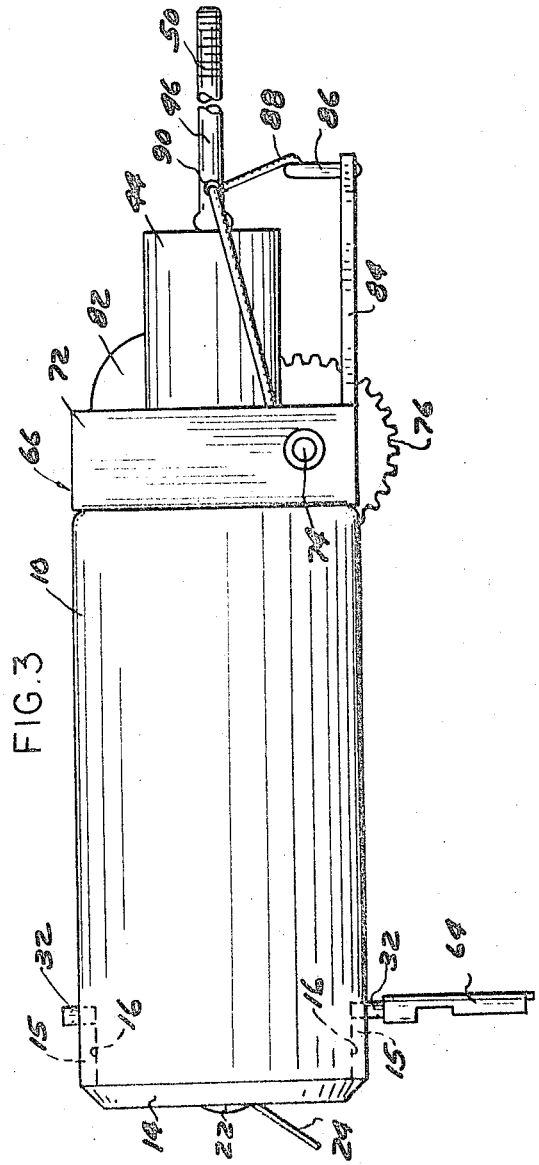
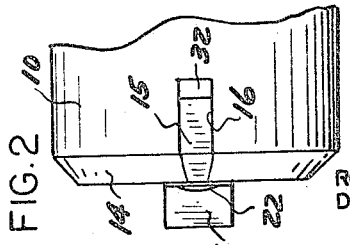
INVENTORS
ROBERT H. VOIGT
DAVID W. LOWE
BY Hauke & Hauke
ATTORNEYS

INVENTORS
ROBERT H. VOIGT
DAVID W. LOWE

BY Hauke & Hauke

ATTORNEYS

United States Patent Office 3,425,009
Patented Jan. 28, 1969

3,425,009
ELECTRO-MECHANICAL ACTUATOR
Robert H. Voigt, Milford, and David W. Lowe, Holly, Mich., assignors, by mesne assignments, to Dynatron, Incorporated, Milford, Mich., a corporation of Michigan
Filed Sept. 10, 1965, Ser. No. 486,397
U.S. Cl. 335—177                                    7 Claims
Int. Cl. H01h 9/54

ABSTRACT OF THE DISCLOSURE

An electro-mechanical actuator which includes a fixed core member, a movable core member and two electromagnetic coils. Switch means are actuated to energize the coils and to automatically disconnect one coil when the movable core member is in a holding position and a flywheel is connected to the core member to eliminate impulsive movement thereof.

---

The present invention relates to actuating devices, particularly to electro-mechanical actuators and more particularly to solenoid actuators for converting electrical energy to a mechanical movement.

Heretofore vacuum actuators have been commonly used to produce an axial or a rotational movement in those installations which require that the actuator be compact, economically produced, quiet in operation and consume very little input power. Because of these characteristics vacuum actuators are commonly used to actuate automotive devices although where more power is required, electric motors or fluid cylinders and pistons may be used. These latter have the disadvantages that they are expensive and at least in the case of electric motors, require too much input power and are noisy.

Vacuum actuators, while they are for the most part satisfactory for actuating mechanisms producing a light load, they do not work well when the load is heavy. Further such systems are prone to malfunction or inoperability when dirt, air, or moisture finds its way into the vacuum hoses which make up a large part of the system.

Electro-mechanical actuators such as solenoids while offering more reliability and greater power than vacuum actuating systems have been for the most part rejected by automotive engineers and other users of small actuating systems as a replacement for vacuum systems because they have heretofore been too large, too expensive, too noisy and they have required too great a continuous duty current input.

The present invention provides a solenoid type actuator which overcomes the disadvantages of vacuum and conventional solenoid actuators. As will become more apparent as the description proceeds, the electro-mechanical actuator of the present invention comprises a pair of electro-magnetic coils one of which utilizes a relatively high amount of electrical energy and the other utilizing a lesser amount of energy. Switch means energize both coils to produce the desired mechanical motion so that the actuator will develop sufficient power to perform tasks which heretofore required an electric motor or a hydraulic system. Once the motion has been produced, switching means are automatically actuated to de-energize the high energy coil. The low energy coil will retain the mechanical member in the actuated position and will consume very little electrical energy while doing so. This overcomes the continuous energy consumption problem inherent in heretofore known solenoids. To overcome the noise problem an impulse damping means is coupled to the actuated mechanical member to reduce impulsive movement and to thereby reduce the operating noise level of the device.

It is an object then of the present invention to provide an improved actuating means to be used in place of vacuum actuating systems and the like by providing an electrical mechanical actuator capable of producing a powerful movement of a mechanical member and a retention of the member in the actuated position with relatively little electrical energy consumption.

It is still another object of the present invention to improve solenoid type actuators by providing such an actuator capable of producing a high mechanical force and requiring a low continuous duty input.

It is yet another object of the present invention to improve actuators by providing a solenoid actuator having means for damping the impulsive action of the actuator to thereby reduce the operating noise level thereof.

Still further objects and advantages of the present invention will readily occur to one skilled in the art to which the invention pertains upon reference to the following description of one preferred embodiment thereof. The description makes reference to the following drawings in which like reference characters refer to like parts throughout the several views and in which FIG. 1 is a longitudinal cross-sectional view of a preferred actuator of the present invention with portions illustrated in elevation for purposes of clarity.

FIG. 2 is a fragmertary elevational view of a portion of the structure shown in FIG. 1.

FIG. 3 is an elevational view as seen from the lower side of FIG. 1.

Figure 4:
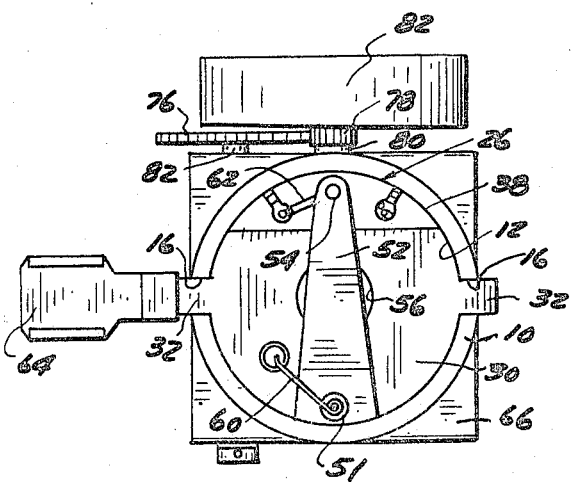
FIG. 4 is a view as seen from the left hand side of FIG. 1 with the cap of the actuator removed for purposes of clarity.

Now referring to the drawings for a more detailed description of the present invention, a preferred actuator is therein illustrated as comprising a ferro-magnetic housing 10 having open ends and defining a substantially cylindrical inner cavity 12. An end cap 14 is secured to the housing 10 by means of key portions 15 fitting in slots 16 formed in the housing 10 as can best be seen in FIGS. 2 and 3, to close one end of the cavity 12. The end cap 14 is preferably provided with an axially extending peripheral flange 18 which carries the key portions 15 and has an upper removed portion 20. The flange 18 engages the inner surface of the housing 10. A rivet 22 secures an electrical terminal 24 to the exterior of the end cap 14.

A bobbin 26 preferably constructed of plastic or similar material is mounted within the cavity 12 by means of a radially inwardly extending flange portion 28 formed in the housing 10 at the end opposite the end cap 14. As can best be seen in FIGS. 2–4, a semi-arcuate ferro-magnetic core plate 30 is provided with peripheral ears 32 received by the slots 16 and secured in place by the key portions 15 and the flange 18 of the end cap 14 urging the ears 32 against the ends of the slots 16. The core plate 30 abuts the end of the plastic bobbin 26 to urge it against the flange portion 28.

The bobbin 26 is preferably cylindrical and hollow to form an inner cyindrical cavity 34 and is provided at each end with radially outwardy extending flange portions 36. The windings of an electro-magnetic hold coil 38 and an electromagnetic primary high energy coil 40 are carried by the bobbin 26 in the space defined by the inner surface of the housing 10, the flange portions 36 and the exterior surface of the bobbin 26.

A cylindrical ferro-magnetic core 42 is secured to the core plate 30 by any convenient means (not shown) so that core 42 is fixed within the end of the bobbin 26. A cylindrical ferro-magnetic core 44 is axially slidably mounted within the bobbin 26.

The movable core 44 carries a rod 46 having an elongated inner end 48 and a threaded outer end 50. The threaded outer end 50 is adapted to be coupled to the mechanism to be actuated (not shown).

Figure 5:
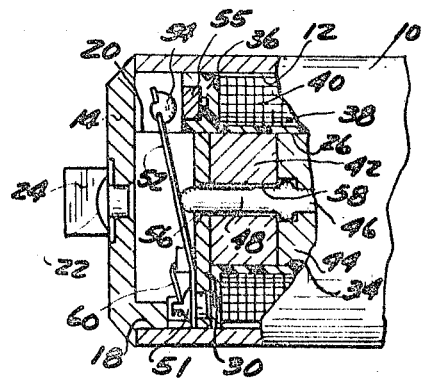
FIG. 5 is a fragmentary cross-sectional view of structure shown in FIG. 1 but illustrating the switching means of the actuator in the energized position.

As can best be seen in FIGS. 1, 4, and 5, the core plate 30 by means of a rivet 51 carries a resilient contact leaf arm 52 having an electrical contact 54 which normally engages a fixed contact 55 carried by the flange portion 36 of the bobbin 26. The core plate 30 and the fixed core 42 are provided with central apertures 56 and 58 respectively which receive the elongated end portion 48 of the rod 46 when the movable core 44 is moved to a position adjacent the fixed core 42, as shown in FIG. 5. The leaf arm 52 is disposed across the aperture 56 provided in the core plate 30 so that when the movable core 44 is in the position shown in FIG. 5, the end portion 48 of the rod 56 moves the leaf arm 52 to a position in which the contact 54 is out of engagement with the contact 55. An electrical lead 60 connects one end of the hold coil 38 to the rivet 51 and an electrical lead 62 connects one end of the primary coil 40 to the fixed contact 55. The terminal 24 is connected by leads (not shown) to the opposite ends of coils 38 and 40 so that it is a common junction therefor. An electrical terminal 64 is carried by one of the ears 32 of the core plate 30 as can best be seen in FIGS. 3 and 4.

As can best be seen in FIGS. 1 and 3, a bracket 66 is mounted to the flange portion 28 of the housing 10 preferably by rivets 68 and is provided with a central opening 70 permitting passage of the movable core 44 and the rod 46 and a pair of spaced arms 72 which provide the means for rotatably mounting a shaft 74 on an axis normal to and out of the path of the movable core 44. The shaft 74 extends through one of the arms 72 and has fixed thereto exteriorly of the arm 72 a driving spur gear 76. The spur gear 76 meshes with a driven spur gear 78 which is fixed to a shaft 80 rotatably mounted in the arm 72. The shaft 80 carries a flywheel 82.

The bracket 66 further comprises a forward extension 84 as can best be seen in FIG. 1 and 3 which carries a loop eye 86. A coupling cord 88 has its ends fixed to opposite ends of the shaft 74 and extends through the loop eye 86 and through a hole 90 provided in the rod 48.

Figure 7:
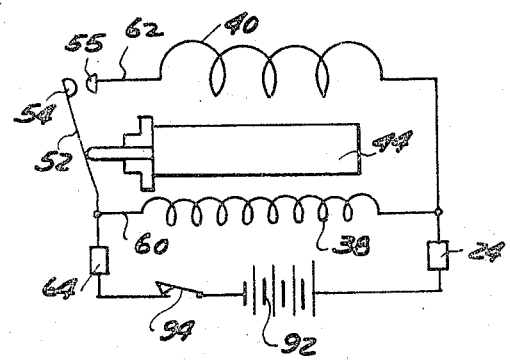
FIG. 7 is a schematic illustration of the actuator of the present invention in the energized position.
Figure 6:
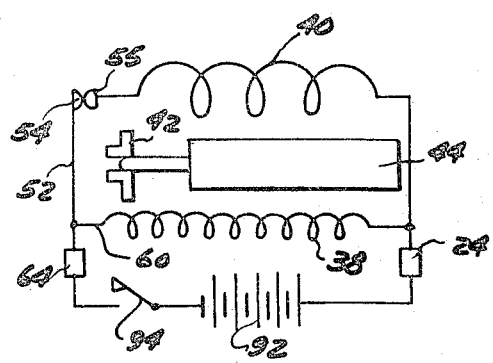
FIG. 6 is a schematic illustration of the actuator of the present invention in the de-energized position.

Referring to FIGS. 6 and 7, for an understanding of how the actuator device of the present invention functions, the device is illustrated schematically as being connected electrically by terminal 24 to a source of electrical power such as the battery illustrated schematically at 92 and through a switch 94. FIG. 6 illustrates the device in the de-energized position. It is intended that the mechanism attached to the threaded end 50 of the rod 46 is spring loaded so that with the switch 94 open and the coils 38 and 40 de-energized, the rod 46 and the movable member 44 will be moved to the position illustrated schematically in FIG. 6 and shown in section in FIG. 1. In this position the end 48 of the rod 46 is out of engagement with the contact leaf 52 and the contact members 54 and 55 are closed.

Closing the switch 94 then will complete a parallel circuit through the coils 38 and 40 to produce a strong magnetic force which will attract the movable ferro-magnetic core 44 to the fixed magnetic core 42. The movement of the core 44 toward the core 42 produces a corresponding movement of the rod 46 to actuate the desired mechanism until the end portion 48 of the rod 46 engages the contact leaf 52 to move the contact 54 out of engagement with the contact 55. At this point the circuit to the high energy coil 40 is broken but because the hold coil 38 remains energized sufficient magnetism is produced to hold the movable core 44 against the fixed core 42. Only a low current is required to maintain the hold core 38 energized. FIG. 7 illustrates schematically and FIG. 5 illustrates in cross-section the hold position of the actuator device. Opening the switch 94 de-energizes both coils 38 and 40 and the spring force applied to the rod 46 will return the actuator device to the positions shown in FIGS. 1 and 6.

The flywheel 82 and its connection to the rod 46 through the gears 76 and 78, the shaft 74 and the cord 88 provides a means of damping axial impulse movements of the movable core 44 and the rod 46 in both directions. This produces smoother operation of the actuator device as well as provides a means which substantially reduces the noise level of the device during operation.

It is apparent that the device of the present invention provides a powerful yet compact actuator device suffering from none of the disadvantages of the more commonly used vacuum systems. The actuator device of the present invention through the provision of the disclosed switching means and the dual coil arrangement provides power when it is needed and substantially reduces electrical energy consumption by automatically de-energizing the high energy coil when it is no longer needed. The operating noise level is substantially reduced and the action of the actuator device is substantially improved over other electro-mechanical actuating devices. The disclosed damping means provides a smoother movement of the actuating rod and by preventing jerky movement of the rod reduces chatter and other noise to substantially reduce the operating noise level of the device.

It is further apparent that although we have described but one embodiment of our invention, many changes and modifications can be made therein without departing from the spirit of the invention as expressed by the appended claims.

We claim:
1. An actuator device comprising:
 (a) a housing,
 (b) a first electromagnetic coil and a second electromagnetic coil mounted within said housing,
 (c) a first magnetic core member fixed within said coils and a second magnetic core member movably mounted within said coils for movement toward and away from said first core member where upon energization of said coils said second core member is moved toward said first core member,
 (d) means for connecting said coils to a source of electrical power and a normally closed switch means disposed in circuit with said second coil, means carried by said second core member for opening said switch means upon a predetermined movement of said second core member toward said first core member,
 (e) said movable core member being movable axially with respect to said coils,
 (f) a flywheel and means carried by said housing and rotatably supporting said flywheel on said axis substantially normal to the axial movement of said second core member,
 (g) means connecting said second core member and said flywheel to produce rotation of said flywheel upon axial movement of said second core member, said means comprising a first shaft supporting said flywheel and a second shaft rotatably supported by said housing, gear means connecting said first and second shafts to rotate together and a coupling cord having its ends fixed to said second shaft and its intermediate portion connected with said movable core member whereby said movable core member moves only when said cord winds and unwinds on said second shaft and rotation of said second shaft necessitates corresponding rotation of said flywheel.

2. The device as defined in claim 1 and in which said gear means comprises a first gear disposed on said second shaft which meshes with a second gear disposed on said first shaft to provide connection between said first and second shafts.

3. The device as defined in claim 1 wherein said first and second shafts are substantially parallel to each other.

4. The device as defined in claim 1 wherein said first and second shafts are substantially parallel to each other and said gear means comprises a first gear disposed on said second shaft which meshes with a second gear disposed on said first shaft to provide connection between said first and second shafts.

5. The device as defined in claim 1 and in which said means disposed on said housing for rotatably supporting said flywheel comprises a bracket having spaced apart arms upon which said first and second shafts are rotatably mounted.

6. The device as defined in claim 1 and in which
 (a) said switch means comprises a resilient contact leaf arm, and
 (b) said switch opening means comprises an extension carried by said second core and engaging said contact to open said switch means at a predetermined position of said second core.

7. The device as defined in claim 1 and in which said second coil consumes a greater amount of electrical energy than said first coil.

References Cited

UNITED STATES PATENTS

| 1,003,457 | 9/1911 | Heath | 335—239 |
| 1,126,384 | 1/1915 | Burnham | 335—239 |
| 2,407,603 | 9/1946 | Derungs | 335—256 |
| 3,018,418 | 1/1962 | Conrad | 317—123 |
| 1,665,318 | 4/1928 | Mead | 335—64 |

FOREIGN PATENTS

| 41,868 | 1/1933 | France. |

BERNARD A. GILHEANY, *Primary Examiner.*

HAROLD BROOME, *Assistant Examiner.*

U.S. Cl. X.R.

310—14, 34; 335—256